Patented Apr. 25, 1933

1,905,584

UNITED STATES PATENT OFFICE

JEAN V. GIESLER, OF KNOXVILLE, TENNESSEE, ASSIGNOR TO THE FULTON SYLPHON COMPANY, OF KNOXVILLE, TENNESSEE, A CORPORATION OF DELAWARE

METHOD OF MAKING THIN WALLED TUBES

No Drawing. Application filed February 21, 1930. Serial No. 430,453.

This invention relates to the art of producing relatively thin metal tubes, and particularly tubes of this character for use in the manufacture of highly-flexible, deeply-corrugated, tubular metal walls or bellows.

Bellows are ordinarily manufactured from tubing having a wall thickness on the order of .010", and in order to produce a tube of this wall thickness, it is customary to form a seamless tube and subject it to successive drawing operations. It has also been proposed to form the tube from thin rolled stock which is bent into a cylinder and brazed along a longitudinal seam. Taking brass, which is the metal most commonly employed in the manufacture of bellows, the forming of this seam requires the use of a spelter or solder which is of different composition from the tube metal, so as to have a lower melting point than brass, and hence the seam is non-homogeneous.

In order that a bellows may be capable of withstanding the hundreds of thousands or millions of flexures to which it is subjected in service the metal should be as nearly homogeneous as possible. Hence the danger that a non-homogeneous seam running the length of the bellows may open under repeated flexure and render the bellows inoperative as a fluid container, or possess physical properties under repeated stress unlike those of the metal of which the remainder of the wall is composed, has resulted in the use of drawn tubes wherever such was expedient and the need of extreme care in forming the seam when, for one reason or another, it became necessary or desirable to use tubes formed of sheet metal brazed into a cylinder.

I have discovered that tubes suitable for the manufacture of bellows can be manufactured from brazed tubing, where it has heretofore been considered necessary to employ drawn tubing, without danger of the brazed seam opening under repeated flexure and without introducing a band having physical characteristics unlike the remainder of the wall, so that the use of brazed tubing in the manufacture of bellows can be extended and economies introduced into the manufacture of bellows by forming the tubes of sheet metal of appropriate thickness brazed into a cylinder with the use of any usual or suitable spelter or solder applied thereto in any usual or suitable way.

It is therefore the object of this invention to provide a method of manufacturing thin walled tubes from tubes having a non-homogeneous seam so as to render said tube, and the bellows formed therefrom, substantially as durable and uniform in physical characteristics as if made from seamless tubing.

I have discovered that if a tube of metal having a brazed seam is subjected to a plurality of alternate drawing operations and operations during which the metal is subjected to a sufficiently high temperature for an appropriate time to permit of a substantial grain growth from the grain size produced by the drawing operation, the spelter or solder used at the joint will apparently become absorbed in the metal of the tube, so that even under a relatively high magnification there is no observable seam, or continuity of line of spelter or solder, remaining in the tube. Microscopic analysis of sections of brazed tubing treated in accordance with my method appears to show that during the drawing operations the grains of the tube metal are subjected to the usual elongation, with evidence of slippage planes, and refinement of grain, that is characteristic of drawing operations, and then during the alternating periods of grain growth the spelter or solder used in forming the seam is progressively taken up between the grains of the tube metal until all evidence of a seam entirely disappears, and both microscopic examination and physical test of the metal indicate substantial homogeneity at and in the neighborhood of the joint.

While the number of drawing operations and the temperature and time during which grain growth is to be permitted will vary with different metals and different thicknesses of material, and the number of drawing operations and repetitions of grain growth may be varied with different materials and with different thicknesses of material and also with regard to the character of drawing operation employed, the rate of reduction in cross section of the metal desired, and the physical characteristics to be obtained in the tube as a whole, etc., the minimum number of drawing operations and periods of grain growth, for any given time and temperature of grain growth, can be readily determined by one skilled in the art, through practice of the invention as before set out, by microscopically observing the condition of the grains until such time as repeated grain growths effect the desired homogeneity in the metal cross section.

For purposes of exemplification, one example is given of practical application of the invention to the production of a brass tube using 80—20 brass brazed by use of the usual or any suitable spelter. A brazed tube having a wall thickness of approximately .050" is subjected to such a drawing operation as will produce a reduction in wall thickness on the order of 30%. It is then subjected to a temperature on the order of 1050° F. for a period on the order of thirty minutes, so as to permit a substantial grain growth. The tube is then redrawn successively a sufficient number of times to reduce the wall thickness to approximately .008", each redraw reducing the thickness from 25% to 30%, although the earlier drawing operations may effect a somewhat greater reduction in thickness and the later drawing operations effect a less reduction in thickness, and between each two drawing operations the tube is subjected to a period of grain growth like or on the order of that employed after the first drawing operation. I have found that a brazed tube of 80—20 brass reduced in thickness from .050" to .008" by six drawing operations of the character just described, with intermediate periods of grain growth obtained by subjecting the brass to a temperature of 1050° F. for thirty minutes, loses all evidence of the existence of the seam under a microscopic examination, and the metal not only appears homogeneous under such examination but under physical tests possesses the characteristics of homogeneous metal.

Hence the tube and the bellows formed therefrom possess the characteristics of a tube formed from seamless tubing, and the resultant bellows have no seam to open, while the metal is as durable under repeated flexures and uniform in its properties as though made from a seamless tube. Hence economies of manufacture may be obtained by the use of tubes formed of sheet metal rolled to the appropriate thickness and brazed in any usual or suitable way into a seam.

While the invention has been illustrated in its application to the forming of tubes of brazed brass, the invention is not limited thereto, as it is applicable to the forming of tubes of other metals where non-homogeneous seams exist. Metals of various thicknesses may be employed, and the number of drawing operations and the temperature and time of grain growth may be varied, having regard to the characteristics desired in the tubes as a whole, without departing from the spirit of this invention. Reference is therefore to be had to the appended claims for a definition of the limits of the invention.

What is claimed is:

1. In the manufacture of thin walled tubes for highly-flexible, deeply-corrugated tubular metal walls, the method which includes forming a tube with a non-homogeneous seam including a metal different from that of the tube, alternately subjecting the tube to a plurality of drawing operations during which the tube wall is reduced in cross section and a plurality of operations during which the tube is subjected to a sufficient temperature for a sufficient time to permit a substantial grain growth therein and continuing said alternate operations until under microscopic examination said seam has disappeared.

2. In the manufacture of highly-flexible, deeply-corrugated tubular metal walls, the method which includes forming a tube from sheet brass, joining the edges of the metal by spelter or solder to form a non-homogeneous seam, and subjecting the tube alternately to a plurality of drawing operations and a plurality of heating operations sufficient to permit a substantial grain growth therein.

3. In the manufacture of tubes for highly-flexible, deeply-corrugated, tubular metal walls, the method which includes forming a brass tube having a brazed or soldered joint, and subjecting the tube in alternation to a plurality of drawing operations and a plurality of heating operations during which a substantial grain growth is permitted therein.

4. In the manufacture of relatively thin metal tubes, the method which includes forming a tube with a seam including a dissimilar metal, subjecting the tube to a plurality of alternate operations during which the thickness of the tube wall is reduced and then a substantial grain growth is permitted therein and continuing said alternate operations until said dissimilar metal has been distributed with substantial uniformity between the grains of the metal of the tube.

5. A method of making relatively thin tubes which includes forming a tube from sheet brass, forming a soldered joint therein, and then in alternation subjecting the tube to drawing operations and operations permitting a substantial grain growth therein until under microscopic examination the seam has disappeared.

6. A method of making relatively thin brass tubes which includes forming sheet brass into a cylinder and brazing the seam, and then in alternation subjecting the tube to a plurality of operations during which the cross section of the metal is drawn down and then the metal is heated to a temperature and for a time sufficient to permit of a substantial grain growth therein.

7. In the manufacture of relatively thin metal tubes having a seam which includes a metal different from that of the tube, the method which includes rendering the metal homogeneous at the seam by subjecting the tube in alternation to a plurality of drawing operations followed by heating operations of a time and temperature sufficient to permit a substantial grain growth therein and continuing said alternate operations until under microscopic examination the seam metal appears to be absorbed between the grains of the metal of the tube.

8. In the manufacture of highly-flexible, deeply-corrugated tubular metal walls, the method which includes forming a brass tube from sheet brass, joining the edges of the metal by spelter or solder to form a non-homogeneous seam, and then in alternation subjecting the tube to drawing operations and operations permitting a substantial grain growth therein until under microscopic examination the seam has disappeared.

9. A method of making relatively thin tubes which includes forming a tube from sheet brass, joining the edges of the sheet brass by the use of a different metal to form a non-homogeneous seam, and then in alternation subjecting the tube to drawing operations and operations permitting a substantial grain growth therein until under microscopic examination the grains of the metal of the non-homogeneous seam have been absorbed between the grains of the brass.

10. A method of making relatively thin tubes of brass which includes forming a tube from sheet brass, uniting the edges of the sheet by a spelter or solder having a lower melting temperature than the brass, and then in alternation subjecting the tube to drawing operations and operations permitting a substantial grain growth therein, until under microscopic examination the grains of spelter or solder have become distributed in substantial uniformity between the grains of brass.

In testimony whereof I have signed this specification.

JEAN V. GIESLER.